3,219,505
PROCESS FOR THE PREVENTION OF MARINE GROWTH
Herman W. Hilding, 17 Elliott Road,
Fort Walton Beach, Fla.
No Drawing. Filed May 22, 1961, Ser. No. 111,872
3 Claims. (Cl. 156—154)
(Granted under Title 35, U.S. Code (1952), sec. 266)

The invention described herein may be manufactured and used by or for the United States Government for governmental purposes without payment to me of any royalty thereon.

This invention relates to the process and material for preventing marine growth on materials subjected to immersion in sea water and more particularly to a method whereby prolonged protection is provided with a minimum of maintenance and overhaul.

In this process, the protective powers of resin or glass cloth resin is combined with the deterrent effects of copper to prevent even the initial attack of marine life on a treated item.

Accordingly, it is an object of this invention to combine two readily available materials that have anti-fouling properties with respect to marine growth.

It is another object of this invention to provide a novel process for providing a material which is protected against the deleterious effects of marine growth when the material is immersed in sea water.

It is still another object of this invention to provide a coating for water immersible objects that protects them against marine growth.

A further object of this invention involves the protection against marine growth of water immersible objects by utilizing conventional, currently available materials and processes that lend themselves to standard mass production manufacturing techniques.

A still further object of this invention involves the provision of a surface preparation which eliminates marine growth and which does not have its beneficial effects negated by a partial removal.

These and other advantages, features and objects of this invention will become more apparent from the following description.

Resinated glass cloth or Fiberglas has been used with great success since the addition of the unique qualities of the glass fibers to a plastic increases its mechanical strength, stiffness, impact resistance and dimensional stability while giving it a wider useful temperature range. In addition, glass fibers may be oriented to resist specific loadings since it acts as a reinforcement of the plastic material. Thus, a product having light weight with great physical strength is achieved when glass fibers are combined with a plastic.

The resin mixes available for the plastic portion of the article may be either thermosetting or thermoplastic; however, thermosetting resins are generally chosen because of their ability to withstand elevated temperatures normally encountered. Polyester thermosetting resins generally find the widest application because of the moderate temperatures required for curing and their facility for molding. In fact, polyester resins may be cured merely by the addition of catalysts and accelerators.

Although polyesters are most generally used, epoxies, phenolics, melamines and silicones may be utilized depending on the particular properties desired.

Resin mixes, in addition to the resin and catalyst, contain a filler and pigment which are utilized with glass fibers. The filler and pigment extend the resin and thereby lower the cost in addition to enhancing the appearance of the finished product.

This invention involves the addition of anti-fouling properties of copper and its compounds with respect to marine growth to either a coating material or in the material itself from which an article is to be fabricated.

As a coating for marine articles, a water impermeable, thermosetting resin is combined with small particles of copper or compounds of copper which possess poisonous properties with respect to barnacles, fungi and other marine life which tends to attack boats or other sea water immersed objects. If a resin is mixed with its catalyst or plasticizer and has small particles of copper mixed therewith, it may be sprayed or brushed on a surface to be immersed in sea water to coat said article to provide a protection against the effects of water thereon. In addition, a dispersion of copper and surfacing thereof occurs which presents toxic copper spaced in the resin bond with such proximity as to permit no access surface to marine life. With dispersion in the binder, scrape, wear or other abrasion, not completely removing the surface treatment, only exposes more copper particles to be utilized for their protective characteristics.

When glass cloth is used in any of the processes described in the book, "Fiberglas Reinforced Plastics," by R. H. Sonneborn, published in 1954 by Reinhold Publishing Corporation, to manufacture a water immersible article, the filler of the thermosetting resin mix may be made to include toxic copper or copper compounds in small particles.

Alternatively, an item to be immersed may have glass cloth applied thereto and be impregnated, for example, by spraying with the copper particle containing resin binder. The resin binder not only fills the glass cloth as a cementing agent, but it binds the glass cloth resin mass to the surface of the treated item and acts as a resin bound copper mass which provides continuous toxic prevention against marine growth.

Damage to the glass cloth, resin and copper mass of either the coated or manufactured article does not cause deterioration of its protective properties, short of a complete breakthrough.

Since the resinous material may completely surround the copper particles, a light sanding is all that is necessary to obtain the full potentialities of the marine growth inhibiting properties. Larger sized particles than the thickness of the resin coating would eliminate the chance that the particles would be completely coated after a light sanding.

Thus, a surface treatment or manufacture of water immersible articles is provided which may be easily applied and renewed.

Although the invention has been described with reference to particular embodiments, it will be understood to those skilled in the art that the invention is capable of a variety of alternative embodiments within the spirit and scope of the appended claims.

What I claim is:

1. A process for inhibiting marine growth on water immersible articles comprising the steps of spraying a copper particle containing, water impermeable, thermosetting resin on the portions of said article normally exposed to water, and lightly sanding said resin to expose the said copper particles.

2. A process as defined in claim 1 including placing a glass fiber cloth on said portions of said article normally exposed to water prior to said spraying.

3. A process for manufacturing a water immersible article having marine growth inhibiting properties comprising the steps of arranging a glass fiber cloth in the shape of said article, impregnating said cloth with a copper particle, containing, water impermeable thermosetting resin binder, and lightly sanding said resin to expose the said copper particles.

(References on following page)

References Cited by the Examiner

UNITED STATES PATENTS

| | | | |
|---|---|---|---|
| 2,476,372 | 7/1949 | Heiks | 106—15 |
| 2,579,610 | 12/1951 | Pitre et al. | 106—15 |
| 2,970,923 | 2/1961 | Sparmann | 260—40 |
| 3,154,460 | 10/1964 | Graner et al. | 161—93 |

OTHER REFERENCES

Young et al., Antifouling Paints, Industrial and Eng. Chem. vol. 36, No. 12, December 1944, pp. 1130, 1131 and 1132.

Alfers Modern Plastics, "4 Ways of Building Plastic Boats," November 1952, pp. 102–106 inclusive.

Young et al., "Industrial and Engineering Chemistry," vol. 35, No. 4, April 1943, pp. 432–8.

Ketchum et al., Ibid., vol. 37, No. 5, May 1945, pp. 456–60.

EARL M. BERGERT, *Primary Examiner.*

ALPHONSO D. SULLIVAN, *Examiner.*